United States Patent
Kawano et al.

(10) Patent No.: US 12,473,035 B2
(45) Date of Patent: Nov. 18, 2025

(54) VEHICLE SUBSTRUCTURE PREVENTING DASH PANEL FROM DEFORMATION TOWARD COMPARTMENT

(71) Applicant: HONDA MOTOR CO., LTD., Tokyo (JP)

(72) Inventors: Yuya Kawano, Tokyo (JP); Tokihisa Ueta, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 380 days.

(21) Appl. No.: 18/170,697

(22) Filed: Feb. 17, 2023

(65) Prior Publication Data
US 2023/0286593 A1 Sep. 14, 2023

(30) Foreign Application Priority Data
Mar. 10, 2022 (JP) .................................. 2022-037234

(51) Int. Cl.
*B62D 25/14* (2006.01)
*B62D 25/20* (2006.01)

(52) U.S. Cl.
CPC ....... *B62D 25/145* (2013.01); *B62D 25/2018* (2013.01)

(58) Field of Classification Search
None
See application file for complete search history.

(56) References Cited

U.S. PATENT DOCUMENTS

| | | | |
|---|---|---|---|
| 10,118,647 B2 * | 11/2018 | Yoshida | ............... B62D 21/155 |
| 10,160,493 B2 | 12/2018 | Atsumi et al. | |
| 10,351,178 B2 | 7/2019 | Han et al. | |
| 11,021,192 B2 * | 6/2021 | Soma | .................. B60R 13/0876 |
| 2015/0008703 A1 | 1/2015 | Furusaki et al. | |
| 2015/0145284 A1 | 5/2015 | Nishida et al. | |
| 2016/0052561 A1 * | 2/2016 | Atsumi | ............. B62D 25/2018 |
| | | | 296/187.08 |
| 2016/0221609 A1 | 8/2016 | Furusaki et al. | |

(Continued)

FOREIGN PATENT DOCUMENTS

| | | |
|---|---|---|
| CN | 104114438 A | 10/2014 |
| CN | 107428380 A | 12/2017 |

(Continued)

OTHER PUBLICATIONS

Japanese Office Action received in corresponding Japanese application No. 2022-037234 dated Oct. 24, 2023 with English translation (10 pages).

(Continued)

*Primary Examiner* — Joseph D. Pape
(74) *Attorney, Agent, or Firm* — Rankin, Hill & Clark LLP (57) ABSTRACT

A vehicle substructure includes: a floor panel placed in a tense state between a floor tunnel and a side sill; a front pillar extending in a vehicle up-down direction from a front end of the side sill. The vehicle substructure further includes: a lower dash panel arranged at a front portion of the floor panel; and a lower dash crossmember extending in a vehicle width direction at a lower end of the lower dash panel. The lower dash crossmember has an inner end in the vehicle width direction thereof coupled to the floor tunnel and an outer end in the vehicle width direction thereof coupled to the front pillar.

7 Claims, 5 Drawing Sheets

(56) References Cited

U.S. PATENT DOCUMENTS

| | | |
|---|---|---|
| 2016/0272248 A1 | 9/2016 | Furusaki et al. |
| 2018/0065676 A1 | 3/2018 | Yoshida et al. |
| 2018/0201326 A1 | 7/2018 | Geng et al. |
| 2019/0084514 A1 | 3/2019 | Izutsu et al. |
| 2020/0001929 A1* | 1/2020 | Ohba ................ B62D 25/2018 |

FOREIGN PATENT DOCUMENTS

| | | |
|---|---|---|
| CN | 111391926 A | 7/2020 |
| JP | 4725249 B2 * | 7/2011 |
| JP | 2013-169823 A | 9/2013 |
| JP | 2014-201112 A | 10/2014 |
| JP | 2015-101217 A | 6/2015 |
| JP | 6337860 B2 | 6/2018 |
| JP | 2019-051818 A | 4/2019 |
| JP | 2021-98454 A | 7/2021 |

OTHER PUBLICATIONS

Japanese Office Action received in corresponding Japanese application No. 2022-037234 dated Jan. 30, 2024 with English translation (11 pages).

Chinese Office Action received in corresponding Chinese application No. 202310093607.8 dated Jul. 23, 2025 with English translation (15 pages).

\* cited by examiner

VEHICLE SUBSTRUCTURE PREVENTING DASH PANEL FROM DEFORMATION TOWARD COMPARTMENT

CROSS-REFERENCE TO RELATED APPLICATION

This application claims the benefit of priority to Japanese Patent Application No. 2022-037234 filed on Mar. 10, 2022, the disclosures of all of which are hereby incorporated by reference in their entireties.

TECHNICAL FIELD

The present invention relates to a vehicle substructure preventing a dash panel from deformation toward a compartment.

BACKGROUND OF THE INVENTION

A floor reinforcement of a vehicle has conventionally been arranged vertically between a floor panel and a dash crossmember and joined to the floor panel and a rear front side-member. In addition, the floor reinforcement is arranged below the dash crossmember (see Japanese Patent No. 6337860, hereinafter referred to as Patent Document 1). This causes a collision load transmitted from the rear front side-member to be transmitted to the floor reinforcement, without the floor reinforcement segmentalized in a vehicle front-rear direction by a dash panel.

SUMMARY

Problems to be Solved

However, a structure having the dash crossmember coupled to a side sill is subject to a moment, having a lower portion of a lower dash panel as a reference point, due to a load inputted to the lower dash panel in the event of a minor wrap or oblique collision. This causes a problem of deformation such as the lower dash panel collapsing toward a compartment, to have room for further improvement. The present invention is intended to provide a vehicle substructure to prevent the lower dash panel from deformation toward the compartment.

Solution to Problem

A vehicle substructure of the present invention to solve the above-identified problem includes: a floor tunnel arranged in a center in a vehicle width direction and extending in a vehicle front-rear direction; a side sill extending in the vehicle front-rear direction on an outer side in the vehicle width direction of the floor tunnel; and a floor panel placed in a tense state between the floor tunnel and the side sill. The vehicle substructure further includes: a front pillar extending in a vehicle up-down direction from a front end of the side sill; a lower dash panel arranged at a front portion of the floor panel; and a lower dash crossmember extending in the vehicle width direction at a lower end of the lower dash panel. The lower dash crossmember has an inner end in the vehicle width direction thereof coupled to the floor tunnel and an outer end in the vehicle width direction thereof coupled to the front pillar.

Advantageous Effects of the Invention

The present invention provides a vehicle substructure to prevent the lower dash panel from deformation toward the compartment.

DETAILED DESCRIPTION

Figure 1:
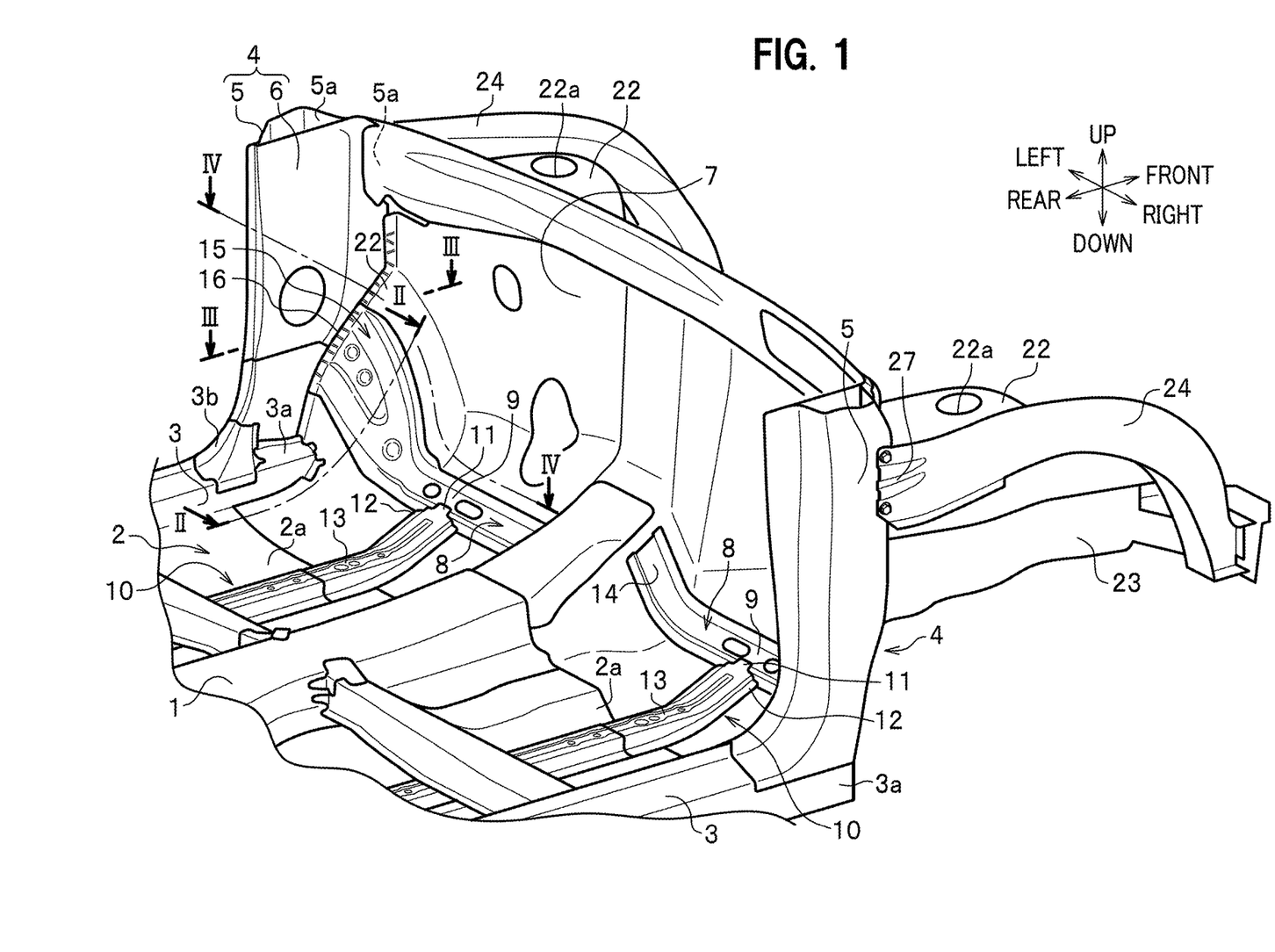
FIG. 1 is a perspective view of a vehicle substructure according to an embodiment of the present invention, around a pillar on the left side in a compartment, without showing interior materials of a vehicle body.

Hereinafter, a description is given of an embodiment of the present invention, with reference to the drawings as required. The same components are denoted by the same reference signs, and duplicate descriptions are avoided. A vehicle substructure of the present embodiment is arranged in a center in a vehicle width direction, as shown in FIG. 1, and includes a floor tunnel 1 arranged in the center in the vehicle width direction and extending in a vehicle front-rear direction, and a side sill 3 extending in the vehicle front-rear direction on an outer side in the vehicle width direction of the floor tunnel 1. In addition, the vehicle substructure includes a floor panel 2 placed in a tense state between the floor tunnel 1 and the side sill 3, and a front pillar 4 extending in a vehicle up-down direction from a front end 3a of the side sill 3.

Among the above-described components, the floor tunnel 1 is formed to have a substantially hat shape in cross-section in the vehicle width direction. The floor panel 2 is formed to have a flat plate shape, and a pair of the right and left floor panels 2 are provided. The floor panels 2 are respectively joined in the vehicle up-down direction to horizontal flanges extending from both sides in the vehicle width direction of the floor tunnel 1. Additionally, the floor panel 2 has an outer end in the vehicle width direction thereof connected to the side sill 3.

The side sills 3 are arranged at right and left outer edges in the vehicle width direction of a vehicle. The side sills 3 are arranged parallel to the floor tunnel 1 along the vehicle front-rear direction. The side sills 3 each have a hollow cross-section in a substantially rectangular shape.

Figure 3:
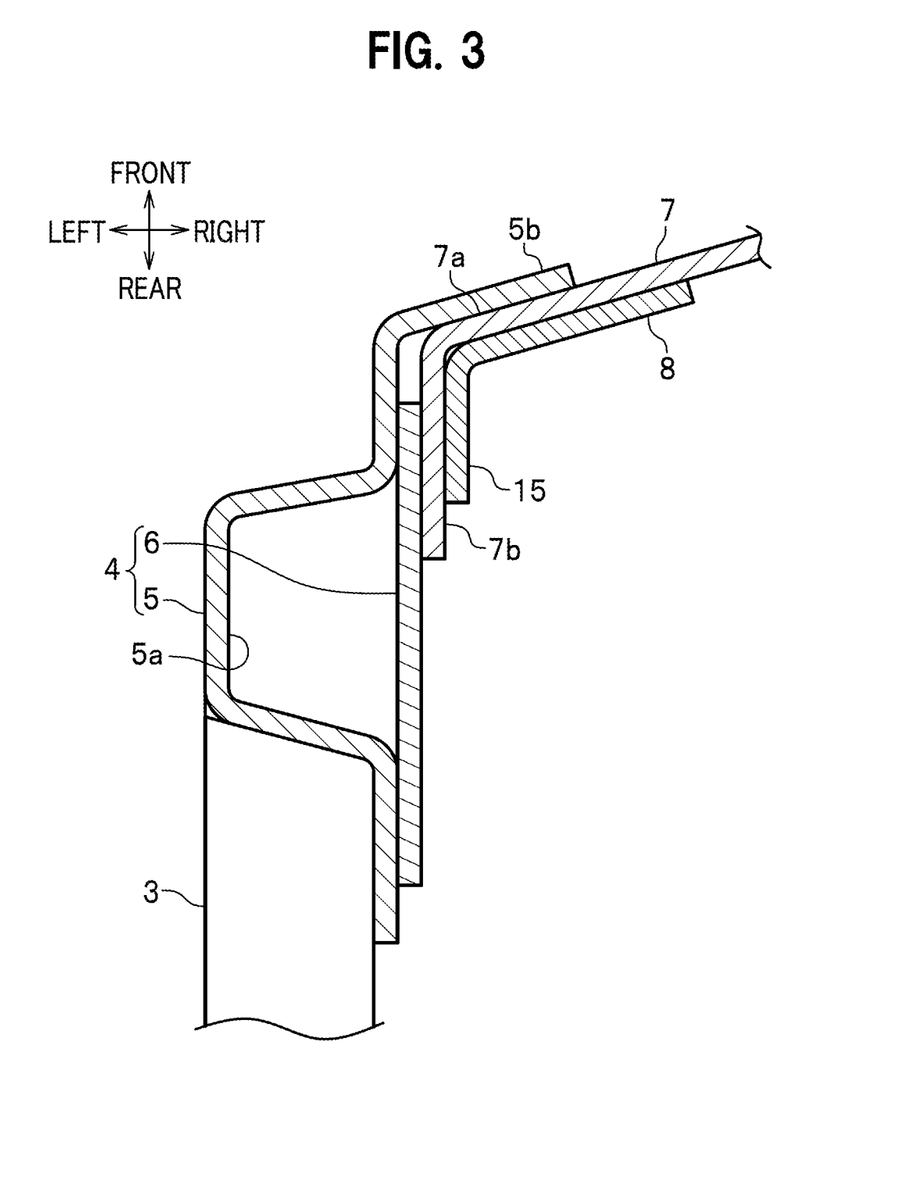
FIG. 3 is an end view of plate-like portions of key components assembled so as to be overlapped with each other, taken along a line III-III in FIG. 1.

The front pillar 4 has an outer pillar 5 formed to have a substantially hat shape in horizontal cross-section, and an inner pillar 6 formed to have a flat plate shape. The outer pillar 5 is joined in the vehicle width direction to the inner pillar 6. This causes the front pillar 4 to form a hollow portion 5a therein, having a substantially trapezoidal shape in horizontal cross-section (see FIG. 3). In addition, the outer pillar 5 of the embodiment has a front edge 5b thereof bent inward in the vehicle width direction and overlapped with a front surface 7a of a lower dash panel 7, as shown in FIG. 3. The front edge 5b is joined in the vehicle front-rear direction to the front surface 7a.

Figure 4:
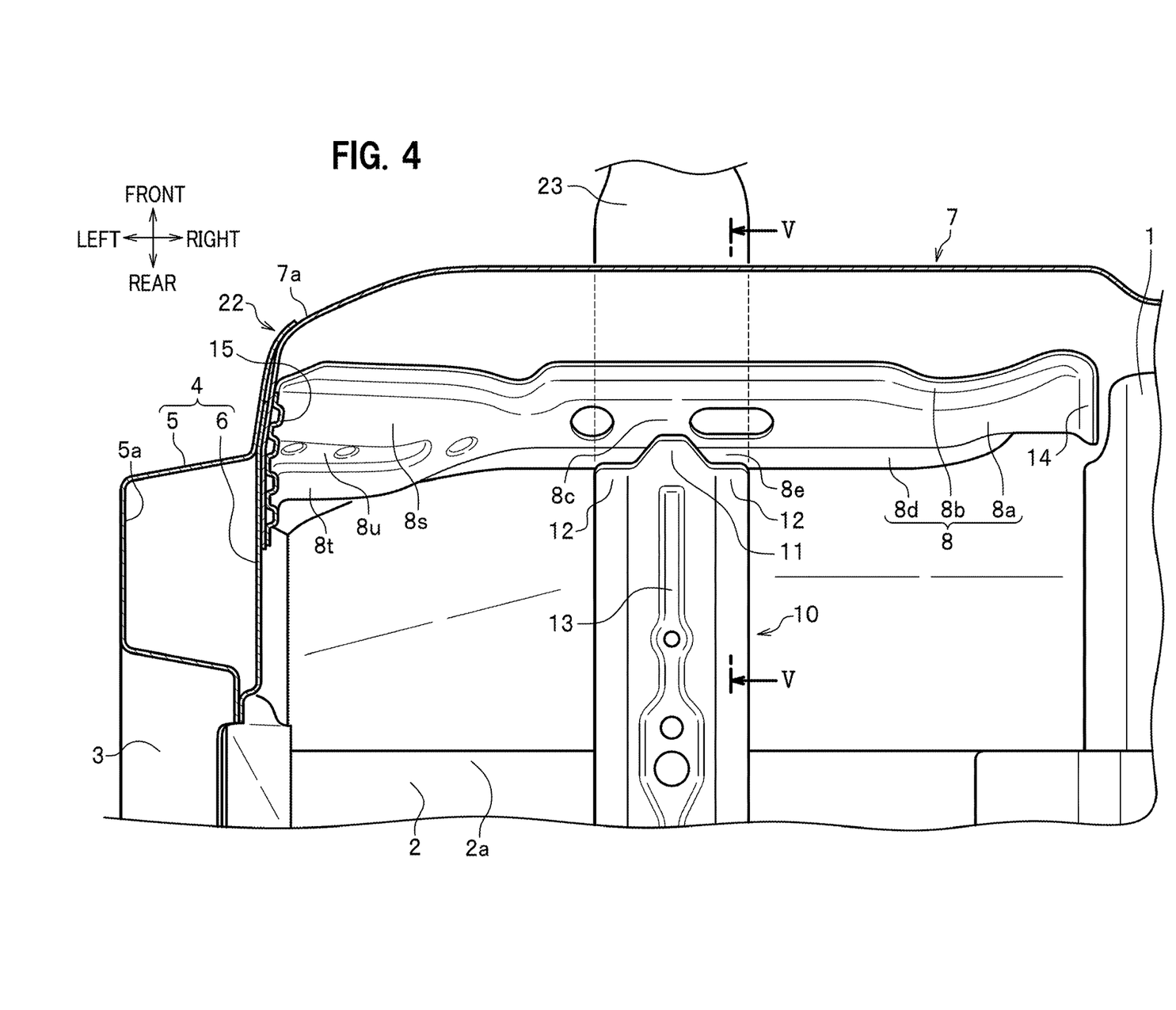
FIG. 4 is a cross-sectional view of the key components, taken along a line IV-IV in FIG. 1, to show a positional relationship between a floor panel and a front side-frame.

The vehicle substructure of the embodiment includes a pair of right and left lower dash crossmembers 8 extending in the vehicle width direction on a lower end portion of the lower dash panel 7, as shown in FIG. 4. Note that a description is given here of a configuration on the left side of the floor tunnel 1, with the floor tunnel 1 assumed as being located in a center in the vehicle width direction of a vehicle, and a description of a configuration on the right side, which is configured similarly, is partly omitted. The lower dash crossmembers 8 have inner ends 14 in the vehicle width direction thereof coupled to the floor tunnel 1. Additionally, the lower dash crossmembers 8 have outer ends 15 in the vehicle width direction thereof coupled to the front pillars 4.

Figure 2:
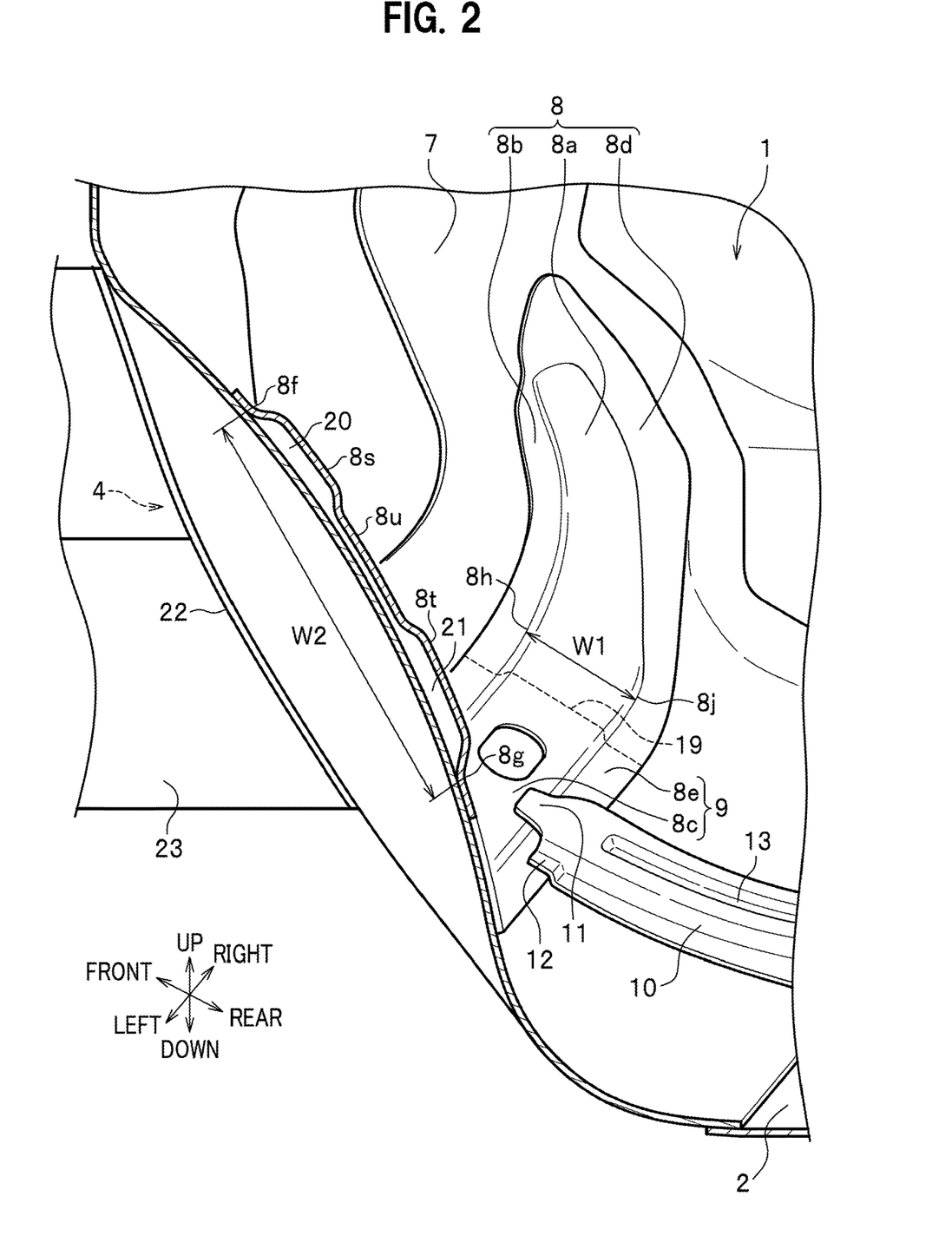
FIG. 2 is a cross-sectional view of the vehicle substructure, taken along a line II-II in FIG. 1.

The lower dash crossmember 8 of the embodiment is formed to have a substantially hat shape in cross-section in the vehicle front-rear direction, as indicated by a dash line in FIG. 2. The lower dash crossmembers 8 and the lower dash panel 7 define therebetween a closed cross-section 19 (see FIG. 5). The lower dash crossmember 8 includes a projection 8a, and front and rear flanges 8b, 8d. The front and rear flanges 8b, 8d of the lower dash crossmember 8 each extend from the projection 8a and are each joined to the lower dash panel 7.

The floor panel 2 includes a floor frame 10 extending in the vehicle front-rear direction between the floor tunnel 1 and the side sill 3, as shown in FIG. 1. A pair of the floor frames 10 are provided respectively on the right and left sides of the floor tunnel 1. The floor frames 10 each have right and left flanges thereof extending in the vehicle width direction from edges on both sides in the vehicle width direction thereof and joined to upper surfaces of the lower dash panel 7 and the floor panel 2. The floor frame 10 is formed to have a substantially hat shape in cross-section in the vehicle width direction. This defines an internal space, running along the vehicle front-rear direction, between the floor frame 10 and the upper surfaces of the lower dash panel 7 and floor panel 2.

The floor frame 10 has a front end thereof joined to an upper surface 9 of the lower dash crossmember 8, as shown in FIG. 4. In the embodiment, the lower dash crossmember 8 has, at an intermediate position in the vehicle width direction thereof, the front end of the floor frame 10 joined thereto, to form a substantially T-shape in a planar view. Said front end of the embodiment includes a first joining portion 11 joined to a top surface 8c of the projection 8a, and a second joining portion 12 joined to an upper surface 8e of the rear flange 8d. That is, the front end of the floor frame 10 is joined to the upper surface 9 (see FIG. 2) of the lower dash crossmember 8, formed with steps at two vertically different height positions.

More in detail, the vehicle substructure of the embodiment has a first joining portion 11 in a tongue shape extending forward in the vehicle front-rear direction from an intermediate portion in the vehicle width direction, at a front end, of the floor frame 10, as shown in FIG. 2. The first joining portion 11 extends from a top surface of the floor frame 10. In addition, a pair of second joining portions 12 extends, on both the right and left sides of the first joining portion 11, from right and left flanges of the floor frame 10 at positions lower in the vehicle up-down direction than the first joining portion 11. The second joining portions 12 are overlapped from above with, and joined to, the upper surface 8e of the rear flange 8d of the projection 8a.

The floor frame 10 is provided, on the top surface thereof, with a bead portion 13 formed along a longitudinal direction thereof at a position in a top view behind the rear flange 8d, as shown in FIG. 4. The bead portion 13 extends rearward, in a form of a concave groove, along the vehicle front-rear direction on the top surface of the floor frame 10. The bead portion 13 of the embodiment has different width dimensions of the concave groove, depending on the position in the vehicle front-rear direction, to have desired stiffness and form according to large and small open holes.

The lower dash crossmember 8 has the projection 8a defining the closed cross-section 19 between itself and the lower dash panel 7, as shown in FIG. 2. In addition, the lower dash crossmember 8 is provided, at the outer end thereof in the vehicle width direction, with projections 8s and 8t as prongs of the two-pronged projection 8a. The projections 8s and 8t define closed cross-sections 20 and 21, respectively. The lower dash crossmember 8 has the front and rear flanges 8b, 8d joined to the lower dash panel 7 on the front and rear sides of the projection 8a, respectively. As shown in FIG. 4, the projection 8a continues, at a portion thereof closer to the front pillar 4, to the projections 8s and 8t as two prongs thereof, to cause the closed cross-sections 19 and 20, 21 to internally communicate with each other in the vehicle width direction.

The projection 8a of the embodiment is two-pronged at a portion thereof closer to the front pillar 4, to become the projections 8s and 8t. The projections 8s and 8t become wider in the vehicle front-rear direction toward the front pillar 4. A trough 8u in a substantially sector shape is formed between the projections 8s and 8t. A distance W2 between a front end 8f of the projection 8s and a rear end 8g of the projection 8t is set to become wider toward the front pillar 4, as compared with a distance W1 between a front end 8h and rear end 8j of the projection 8a at a portion thereof closer to the floor tunnel 1 (i.e., W1<W2). Additionally in the embodiment, a distance between the projections 8s, 8t becomes wider, with an increasing distance of a position in the trough 8u from the floor tunnel 1 toward the front pillar 4. This allows the projections 8s, 8t to have the wider distance W2 between the front end 8f and the rear end 8g, with widths in the vehicle front-rear direction thereof each made to be the same as that of the projection 8a continuing thereto.

Figure 5:
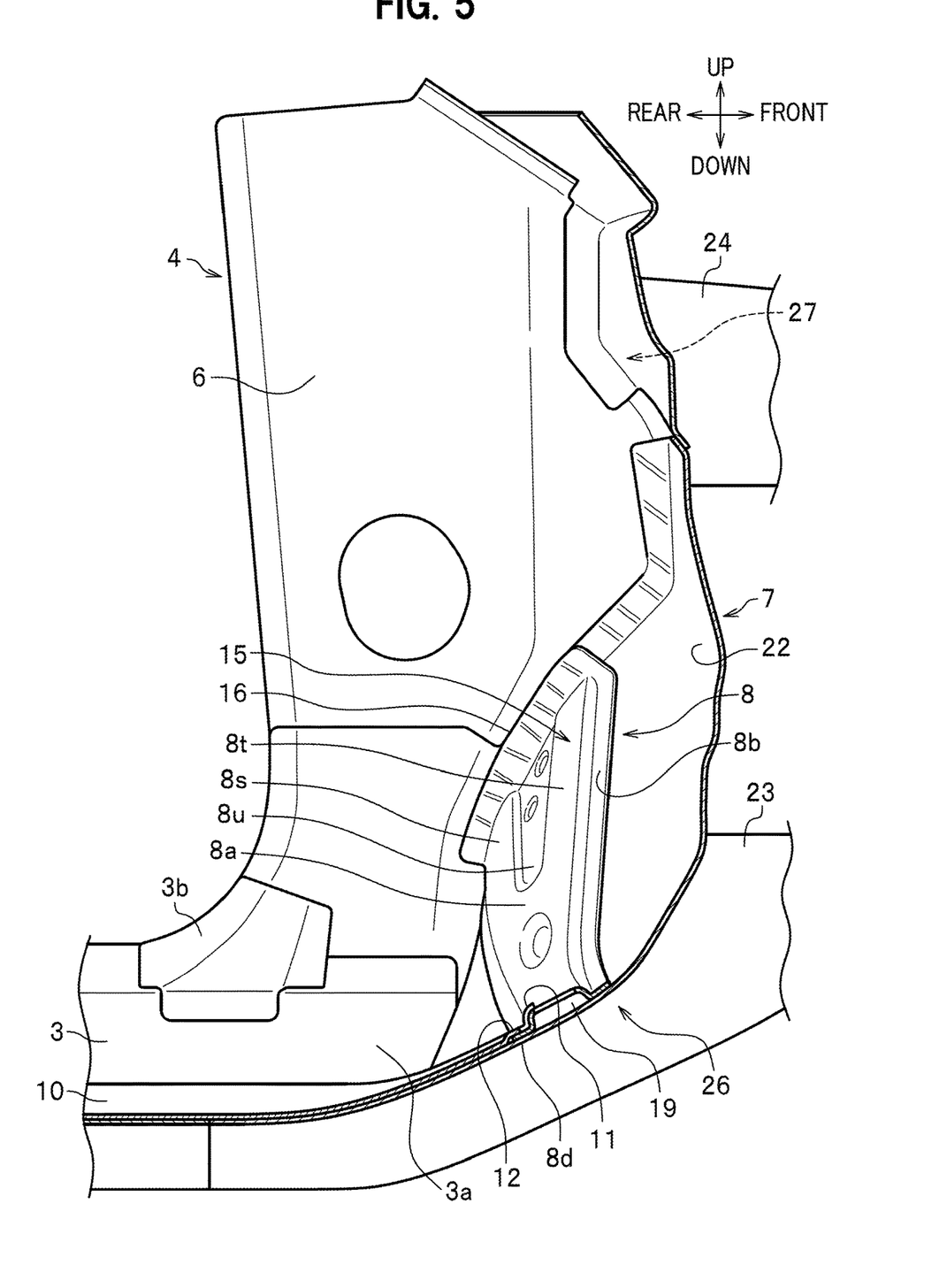
FIG. 5 is a cross-sectional view of the vehicle substructure, taken along a line V-V in FIG. 4, to show joining of a lower dash panel to the floor frame and front side-frame.

The lower dash panel 7 is provided, at an outer portion thereof in the vehicle width direction, with a wheelhouse portion 22 (see FIG. 1) fastened to the front pillar 4, as shown in FIG. 5. In addition, the lower dash crossmember 8 has the outer end 15 bent and extending upward in the vehicle up-down direction. The projections 8s, 8t at the outer end 15 are arranged on an inner surface of the wheelhouse portion 22, with the front and rear flanges 8b, 8d and the trough 8u joined to the wheelhouse portion 22. Further, the lower dash crossmember 8 has a joining portion 16 extending from the flange 8b at the front end thereof through the trough 8u to the flange 8d at the rear end thereof. The joining portion 16 is joined to the inner surface of the wheelhouse portion 22.

Next, a description is given of assembling plate-like portions of the embodiment around the front pillar 4, with reference to FIG. 3. As shown in FIG. 3, the outer end 15 in the vehicle width direction of the lower dash crossmember 8 is joined in the vehicle width direction to an inside in the vehicle width direction of the inner pillar 6 via a rear edge 7b of the lower dash panel 7. Additionally, the front edge 5b of the outer pillar 5 is joined along the vehicle front-rear direction to the front surface 7a of the lower dash panel 7.

The vehicle substructure of the embodiment has a front side-frame 23 extending in the vehicle front-rear direction beyond a front of the lower dash panel 7, as shown in FIG. 4. The floor frame 10 is provided so as to be aligned in the vehicle front-rear direction with the front side-frame 23.

In addition, an upper front side-frame 24 is provided on an outer side in the vehicle width direction of, and above, the front side-frame 23, as shown in FIG. 5. The upper front side-frame 24 has a front end thereof connected to a front end of the front side-frame 23. Additionally, the upper front side-frame 24 has a portion of the wheelhouse portion 22 connected thereto, as shown in FIG. 1. The wheelhouse portion 22 has a damper mount 22a provided on an inner side in the vehicle width direction of the upper front side-frame 24 so as to be flush therewith. An upper portion of a damper (not shown) is mounted to the damper mount 22a. Further, a rear end of the upper front side-frame 24 is fastened via an upper joining portion 27 to an upper portion of the outer pillar 5 of the front pillar 4, as shown in FIG. 5.

Still further, the lower dash crossmember 8 is arranged so as to run along the upper surface of the lower dash panel 7. The lower dash crossmember 8 has the outer end 15 in the vehicle width direction thereof joined to an intermediate portion in the vehicle up-down direction of the front pillar 4. Still further, the front side-frame 23 is joined via a lower joining portion 26 to the lower dash panel 7. Additionally, the upper front side-frame 24 of the embodiment is joined via the upper joining portion 27 to the front pillar 4. Still further, the outer end 15 of the lower dash crossmember 8 is joined at a position vertically between the lower joining portion 26 and the upper joining portion 27.

Next, a description is given of advantageous effects of the vehicle substructure of the embodiment. As shown in FIG. 1, the vehicle substructure of the embodiment includes: the floor tunnel 1 arranged in the center in the vehicle width direction and extending in the vehicle front-rear direction, and the side sill 3 extending in the vehicle front-rear direction on the outer side in the vehicle width direction of the floor tunnel 1. In addition, the vehicle substructure includes the floor panel 2 placed in a tense state between the floor tunnel 1 and the side sill 3, and the front pillar 4 extending in the vehicle up-down direction from the front end 3a of the side sill 3.

Further, the vehicle substructure includes the lower dash panel 7 arranged at the front portion 2a of the floor panel 2, and the lower dash crossmember 8 extending in the vehicle width direction at a lower end of the lower dash panel 7. The lower dash crossmember 8 has the inner end 14 in the vehicle width direction thereof coupled to the floor tunnel 1 and the outer end 15 in the vehicle width direction thereof coupled to the front pillar 4.

Accordingly, the vehicle substructure of the embodiment prevents the lower dash panel 7 from deformation toward a compartment of the vehicle. In particular, the floor tunnel 1 formed on the lower dash panel 7 is coupled to the front pillar 4 via the lower dash crossmember 8. The front pillar 4 extends in the vehicle up-down direction. This allows the lower dash crossmember 8 to be coupled in the vehicle up-down direction to the front pillar 4, in contrast with a case of the lower dash crossmember 8 being coupled to the front end 3a of the side sill 3. Accordingly, when the vehicle has had an offset collision or an oblique collision, for example, a collision load is inputted to the front side-frame 23 or upper front side-frame 24 on either right or left side of the vehicle, as shown in FIG. 5. The front pillar 4 transmits a load applied rearward in the vehicle front-rear direction from the joining portions 26, 27, provided vertically at a distance from each other, to the lower dash crossmember 8. Here, the lower dash crossmember 8 has the joining portion, provided at the outer end 15 of the lower dash crossmember 8, connected at a position between the joining portions 26, 27. This causes the load inputted from the front side-frame 23 or upper front side-frame 24 to be dispersed and transmitted via the lower dash crossmember 8 toward the floor tunnel 1. Thus, the lower dash panel 7 is free from having the load concentrated in a portion thereof, such as a portion thereof in front of the side sill 3 located at a level equal to a lower portion thereof, to have no moment having a lower portion of the lower dash panel 7 as a reference point. As a result, the vehicle substructure prevents deformation such as the lower dash panel 7 collapsing toward the compartment.

The floor panel 2 includes the floor frame 10 provided between the floor tunnel 1 and the side sill 3 and extending in the vehicle front-rear direction, as shown in FIG. 1. The floor frame 10 has the first joining portion 11 joined to the upper surface 9 of the lower dash crossmember 8. The first joining portion 11 of the floor frame 10 is joined to the upper surface 9 of the lower dash crossmember 8. This causes the first joining portion 11 to push the lower dash panel 7 from above to prevent deformation such as the lower dash crossmember 8 being turned up to have the lower dash panel 7 collapsing toward the compartment. This allows a collision load transmitted to the lower dash crossmember 8 to be dispersed and transmitted to the floor frame 10. Accordingly, the lower dash panel 7 and the lower dash crossmember 8 are prevented from deformation toward the compartment.

In particular, in the vehicle substructure of the embodiment, a load, transmitted from the front side-frame 23 to the lower dash crossmember 8, is transmitted to the floor frame 10 linearly in the vehicle front-rear direction. Additionally, the load is transmitted while being dispersed to the front pillar 4 and the floor tunnel 1 via the lower dash crossmember 8 and the lower dash panel 7. Accordingly, deformation of the lower dash panel 7 toward the compartment is prevented.

Further in the embodiment, the lower dash crossmember 8 has, at an intermediate position in the vehicle width direction thereof, the front end of the floor frame 10 joined thereto, to exhibit a substantially T-shape in a planar view, as shown in FIG. 4. This allows a load to be transmitted from the lower dash panel 7 and lower dash crossmember 8 to the floor frame 10 in a balanced way, to prevent the floor frame 10 from unilateral deformation.

The lower dash crossmember 8 has the projection 8a to define the closed cross-sections 19 (see FIG. 5) between itself and the lower dash panel 7, as shown in FIG. 2. In addition, the lower dash crossmember 8 has the front and rear flanges 8b, 8d extending from the projection 8a and joined to the lower dah panel 7. The floor frame 10 has the first joining portion 11 joined to the top surface 8c of the projection 8a, and the second joining portions 12 joined to the upper surface 8e of the rear flange 8d, as shown in FIG. 4.

This makes the lower dash crossmember 8 and the floor frame 10 joined to each other at two or more points by the first joining portion 11 and second joining portions 12. Accordingly, a load inputted to the lower dash crossmember 8 is reliably transmitted to the floor frame 10. Optionally, a step formed heightwise between the upper surfaces 8c, 8e may be abutted on a front end of the floor frame 10 formed between the first joining portion 11 and the second joining portions 12, as a stopper. When a load is inputted to the lower dash crossmember 8, for example, this configuration prevents the lower dash crossmember 8 from deformation toward a direction of being moved backward, in addition to a direction of being turned up. Accordingly, the lower dash panel 7 and the lower dash crossmember 8 are more reliably prevented from deformation toward the compartment.

The floor frame 10 is provided with the bead portion 13 formed along a longitudinal direction thereof at a position, in a top view, behind the rear flange 8d. The floor frame 10 being provided with the bead portion 13 improves bending stiffness in a longitudinal direction of the floor frame 10, to reduce bending deformation of the floor frame 10. Accordingly, the floor frame 10 can prevent the lower dash crossmember 8 from deformation toward the compartment.

As shown in FIG. 2, the lower dash crossmember 8 includes the projection 8a defining the closed cross-section 19 between itself and the lower dash panel 7, and the flange 8b joined to the lower dash panel 7. The projection 8a is formed to have a distance between the front end 8f and the rear end 8g becoming wider toward the front pillar 4. In the embodiment, the projection 8a of the lower dash crossmember 8 has the distance W2 between the front end 8f and the rear end 8g, which continue to each other, becomes wider toward the front pillar 4. This allows for efficiently transmitting a load, inputted to the front pillar 4 due to an offset collision or an oblique collision, to the lower dash crossmember 8. Accordingly, the floor tunnel 1 and the floor frame 10 are free from having the load concentrated in a portion thereof, to prevent the lower dash panel 7 from deformation toward the compartment.

As shown in FIG. 5, the lower dash panel 7 is provided, on an outer side thereof in the vehicle width direction, with the wheelhouse portion 22 (see FIG. 1) fastened to the front pillar 4. The two projections 8s, 8t continuing from the projection 8a and ending at the front pillar 4 have pronged ends thereof arranged on the wheelhouse portion 22. Then, the outer end 15 of the projection 8a, continuously formed as a single piece and ending at the front pillar 4, is joined to an inner surface of the wheelhouse portion 22 via the front and rear flanges 8b, 8d. In the embodiment, the trough 8u between the projections 8s, 8t is also joined to the inner surface of the wheelhouse portion 22. This allows a load, inputted to the front pillar due to an offset collision or an oblique collision, to be transmitted via the two or more projections 8s, 8t to the lower dash crossmember 8, without concentration. Accordingly, a load is dispersed via the lower dash crossmember 8 to the floor tunnel 1 and the floor frame 10, to prevent the lower dash panel 7 from deformation.

In addition, the projection 8a of the embodiment is pronged to the two projections 8s and 8t, with the trough 8u, joined to the wheelhouse portion 22, in between. This causes a distance between the projections 8s and 8t to become wider with an increasing distance of a position in the trough 8u from the floor tunnel 1 toward the front pillar 4. This allows the projections 8s, 8t to have width dimensions as with the projection 8a. Moreover, the trough 8u can be joined to the inner surface of the wheelhouse portion 22. Accordingly, stiffness can be increased in proportion to increasing number of projections, as compared with a case of the lower dash crossmember 8 having a single projection with a widened end, for example.

As shown in FIG. 3, the front pillar 4 has the inner pillar 6 defining the hollow portion 5a, and the outer pillar 5. The outer end 15 in the vehicle width direction of the lower dash crossmember 8 is joined via the lower dash panel 7 to the inner pillar 6. The outer pillar 5 is joined to front surface 7a of the lower dash panel 7. In this manner, the vehicle substructure of the embodiment has assembling plate-like portions of the lower dash crossmember 8 and front pillar 4 optimized. For example, the number and thicknesses of joined panels may be equalized to reduce assembled plate-like portions subject to an inputted load being concentrated. This allows for efficiently transmitting a load, due to an offset collision or an oblique collision, from the front pillar 4 to the lower dash crossmember 8. Accordingly, a load is dispersed to the floor tunnel 1 and the floor frame 10, to prevent the lower dash panel 7 from deformation.

As shown in FIG. 4, the front side-frame 23 extends in the vehicle front-rear direction beyond a front of the lower dash panel 7, and the floor frame 10 is arranged so as to be aligned in the vehicle front-rear direction with the front side-frame 23. This allows the floor frame 10 and the front side-frame 23 to smoothly transmit and disperse a load inputted linearly from the front to the rear in the event of an offset collision or an oblique collision. Accordingly, the lower dash panel 7 and the lower dash crossmember 8 are further prevented from deformation.

As shown in FIG. 5, the upper front side-frame 24 is provided on an outer side in the vehicle width direction of the front side-frame 23. The upper front side-frame 24 is fastened via the joining portion 27 to the outer surface of the outer pillar 5 of the front pillar 4 (see FIG. 1) at a position higher than the front side-frame 23. The lower dash crossmember 8 has at least a portion of the outer end 15 in the vehicle width direction thereof joined to, at an intermediate position in the vehicle up-down direction of, the front pillar 4. This results in having the outer end 15 of the lower dash crossmember 8 joined to the front pillar 4 at a position between the joining portions 26 and 27 joining the front side-frame 23 with the lower dash panel 7. This allows for efficiently transmitting a load inputted from the front side-frame 23, in the event of an offset collision or an oblique collision, to the lower dash crossmember 8. This also allows for efficiently transmitting a load, inputted from the upper front side-frame 24 via the front pillar 4, to the lower dash crossmember 8. Accordingly, the lower dash panel 7 is prevented from deformation toward the compartment.

Additionally, a load applied from a damper in a direction of thrusting upward to the damper mount 22a of the wheelhouse portion 22 is transmitted via the front pillar 4 to the lower dash crossmember 8. Accordingly, the lower dash panel 7 is prevented from deformation toward the compartment.

The present invention is not limited to the above-described embodiment and can be variously modified. The above-described embodiment has been exemplarily described for the purpose of illustrating the present invention, and the invention is not necessarily limited to a configuration having all the components described above. A part of a configuration of an embodiment may be replaced with a configuration of another embodiment. A configuration of an embodiment may be added with a configuration of another embodiment. The embodiments may have configurations thereof partly removed or added/replaced with other configurations. Some of possible modifications to the above-described embodiment are described below.

In the embodiment, the pair of right and left lower dash crossmembers 8.has the inner ends 14 coupled to right and left side surfaces of the floor tunnel 1 and the outer ends 15 coupled to the inner surfaces of the wheelhouse portions 22. However, the present invention is not limited to this configuration. For example, the inner ends 14, formed at inner portions in the vehicle width direction of the right and left lower crossmembers 8 and coupled to the floor tunnel 1, may be coupled to each other so as to be a single piece. In this case, the lower dash crossmember 8 runs across the compartment, substantially end to end in the vehicle width direction, to prevent the lower dash panel 7 from deformation. That is, the lower dash crossmember(s) 8 has/have no limitation on the shape(s), quantity, and coupling means for coupling portions thereof, as far as at least the outer ends 15 in the vehicle width direction thereof are coupled to the front pillar 4.

Additionally in the embodiment, a portion of the projection 8a of the lower dash crossmember 8, ending at the front pillar 4, is arranged on the wheelhouse portion 22 and two-pronged as the projections 8s and 8t. However, the present invention is not limited to this configuration. For example, the projection 8a may not be pronged or may have three or more pronged projections. That is, the projection may not be arranged on the wheelhouse portion 22, as far as having a distance between a front end and a rear end thereof wider toward the front pillar 4 and coupled to the front pillar 4. The pronged projection(s) is/are not limited to the embodiment, on the shape(s), quantity, and (a) component(s) to which the projection(s) is/are joined.

LIST OF REFERENCE SIGNS

1: floor tunnel, 2: floor panel, 2a: front side, 3: side sill, 3a: front end, 4: front pillar, 7: lower dash panel, 7a: front surface, 8: lower dash crossmember, 14: inner end, and 15: outer end.

What is claimed is:

1. A vehicle substructure comprising:
   a floor tunnel arranged in a center in a vehicle width direction and extending in a vehicle front-rear direction;
   a side sill extending in the vehicle front-rear direction on an outer side in the vehicle width direction of the floor tunnel;
   a floor panel placed in a tense state between the floor tunnel and the side sill;
   a front pillar extending in a vehicle up-down direction from a front end of the side sill;
   a lower dash panel arranged at a front portion of the floor panel and having a wheelhouse portion provided on an outer side thereof in the vehicle width direction and joined to the front pillar; and
   a lower dash crossmember extending in the vehicle width direction at a lower end of the lower dash panel,
   wherein the lower dash crossmember has an inner end in the vehicle width direction thereof coupled to the floor tunnel and an outer end in the vehicle width direction thereof coupled to the front pillar,
   the lower dash crossmember has a projection defining a closed cross-section between itself and the lower dash panel, and a flange extending from the projection and joined to the lower dash panel,
   the projection is formed to have a distance between a front end and a rear end of the projection becoming wider toward the front pillar, and
   a portion of the projection, ending at the front pillar, is arranged on the wheelhouse portion and pronged to have at least two prongs.

2. The vehicle substructure according to claim 1, wherein the floor panel includes a floor frame provided between the floor tunnel and the side sill and extending in the vehicle front-rear direction.

3. The vehicle substructure according to claim 2, wherein the lower dash crossmember has a projection defining a closed cross-section between itself and the lower dash panel, and a flange extending from the projection and joined to the lower dash panel, and
   the floor frame includes a first joining portion joined to a top surface of the projection, and a second joining portion joined to an upper surface of the flange.

4. The vehicle substructure according to claim 3, wherein the floor frame is provided with a bead portion formed along a longitudinal direction thereof at a position, in a top view, behind the flange.

5. The vehicle substructure according to claim 1, wherein the front pillar has an inner pillar arranged inside in the vehicle width direction and an outer pillar arranged outside in the vehicle width direction and defining a closed cross-section between itself and the inner pillar,
   the inner pillar has an outer end in the vehicle width direction of the lower dash crossmember joined thereto via the lower dash panel, and
   the outer pillar is joined, at a front end thereof, to a front surface of the lower dash panel.

6. The vehicle substructure according to claim 4, further comprising:
   a front side-frame extending in the vehicle front-rear direction and having a rear end thereof joined to the lower dash panel,
   wherein the floor frame is arranged so as to be aligned in the vehicle front-rear direction with the front side-frame.

7. The vehicle substructure according to claim 6, further comprising:
   an upper front side-frame provided on an outer side in the vehicle width direction of, and above, the front side-frame and fastened to the front pillar,
   wherein the lower dash crossmember has at least a portion of the outer end in the vehicle width direction thereof joined to the front pillar, at a position vertically between a joining portion joining the front side-frame with the lower dash panel and a joining portion joining the upper front side-frame with the front pillar.

* * * * *